Patented Nov. 18, 1952

2,618,585

UNITED STATES PATENT OFFICE 2,618,585

HOG CHOLERA VACCINE AND PROCESS OF PREPARING THE SAME

Ellmore F. Sanders and Earl L. Mundell, Kansas City, Kans., assignors to Jensen-Salsbery Laboratories, Inc., Kansas City, Mo., a corporation of Missouri No Drawing. Application March 25, 1948, Serial No. 17,097

2 Claims. (Cl. 167—80)

This invention relates to an improved hog cholera vaccine and includes a method for its production.

Hog cholera vaccine is commonly produced today by appropriate attenuation of the virus in blood drawn from pigs sick from hog cholera, the attenuation being carried to an extent such that, while the virus is no longer infectious, it nevertheless has the property of stimulating the production of protective anti-bodies and immunizing pigs to which it is administered against hog cholera.

The present invention provides hog cholera vaccine obtained from the spleens of pigs sick with hog cholera, and includes a process for its production. The spleens may be obtained from pigs which are bled for the production of blood vaccine or for the production of simultaneous hog cholera virus or hypering virus. The present invention therefore provides for the production of a useful vaccine from by-product spleens.

In accordance with the present invention, the spleens of the pigs are collected, treated with an antiseptic, usually phenol, to control bacterial contamination, comminuted, and then incubated with a crystal-violet-aqueous-glycerol solution buffered to a pH of about 7.5. The action of the buffered crystal-violet-aqueous-glycerol solution, on incubation, is to attenuate the virus, and destroy its pathogenicity without destroying its capacity to bring about the formation of protective anti-bodies in the pigs into which it is injected, thus forming an effective, safe vaccine.

In producing the new vaccine, about 20 parts of spleen tissue, finely comminuted are incubated with about 30 parts of glycerol, 50 parts of water, buffering salts to buffer the mixture to a pH of about 7.5 and about 0.08 part of crystal violet (or other, equivalent water soluble salt of hexamethyl pararosaniline) for a period of time adequate to assure the attenuation of the virus to the extent required to destroy its virulence without destroying its antigenicity, for example from 5 days to 2 weeks.

The invention will be further illustrated by the following specific example, giving specific directions for the production of a suitable vaccine of the invention.

Example

The spleens from one day's collection of animals are combined and immersed in a 3% phenol solution for 15 minutes. If the spleens are not to be processed the same day, they are frozen and held at a temperature of −20° C. or lower until processing is to be carried out. When processing is to be started, the spleens are finely minced, and to each gram of the minced tissue is added 4 c. c. of a buffered crystal-violet-glycerol solution of the following composition:

| | |
|---|---:|
| Crystal violet (extra pure)_____grams__ | 7.5 |
| Glycerol _____cubic centimeters__ | 3000 |
| Potassium-dihydrogen phosphate__grams__ | 7.75 |
| Sodium chloride_____do____ | 68 |
| Sodium hydrogen phosphate_____do____ | 78 |
| Distilled water_____cubic centimeters__ | 5000 |

This solution is prepared by dissolving the potassium dihydrogen phosphate, the sodium hydrogen phosphate and the salt in the distilled water, adding the glycerol, agitating thoroughly, sterilizing at 15 pounds for 3 hours and then adding the crystal violet.

The resulting admixture of the tissue and the solution is subjected to mechanical emulsification and strained to remove any tissue shreds. It is then distributed in one gallon bottles and incubated at a temperature of 37.5° C. for 14 days. During the incubation period, it is gently agitated twice a day to uniformly distribute the sediment. After incubation, the material is held in storage at a temperature not in excess of 45° F.

The product so obtained may be filled into containers in the same way that vaccine derived from blood is. A satisfactory dosage of the product is 5 cc. administered subcutaneously.

We claim:

1. A hog cholera vaccine including spleen tissue of hog cholera sick pigs attenuated with a solution of crystal violet in aqueous glycerol in the proportions of about 20 parts of tissue to about 30 parts of glycerol and about 50 parts of water, buffered to a pH of about 7.5, said solution containing about 0.08 part of crystal violet.

2. The process of preparing a hog cholera vaccine which includes incubating spleen tissue of pigs sick with hog cholera with an aqueous glycerin solution of crystal violet in the proportions of about 20 parts of tissue to about 30 parts of glycerol to about 50 parts of water, said solution being buffered to a pH of about 7.5, said solution containing about 0.08 part of crystal violet.

ELLMORE F. SANDERS.
EARL L. MUNDELL.

REFERENCES CITED

The following references are of record in the file of this patent:

UNITED STATES PATENTS

| Number | Name | Date |
|---|---|---|
| 1,595,377 | Boynton | Aug. 10, 1926 |
| 2,102,235 | Dorset | Dec. 14, 1937 |
| 2,114,588 | Boynton | Apr. 19, 1938 |
| 2,369,267 | Tilley | Feb. 13, 1945 |

OTHER REFERENCES

I. Doyle—"Crystal Violet Vaccine for the Prevention of Swine Fever" in The Veterinary Journal (London) March to April 1942, pages 51 to 64.

Koprowski et al. and Baker in Proc. Soc. Exptl. Biol. and Med., volume 63, October 1946, pages 178 to 187.